Oct. 11, 1955   L. T. ELIEL   2,720,029
PHOTOGRAMMETRIC APPARATUS
Filed Sept. 22, 1952   3 Sheets-Sheet 1
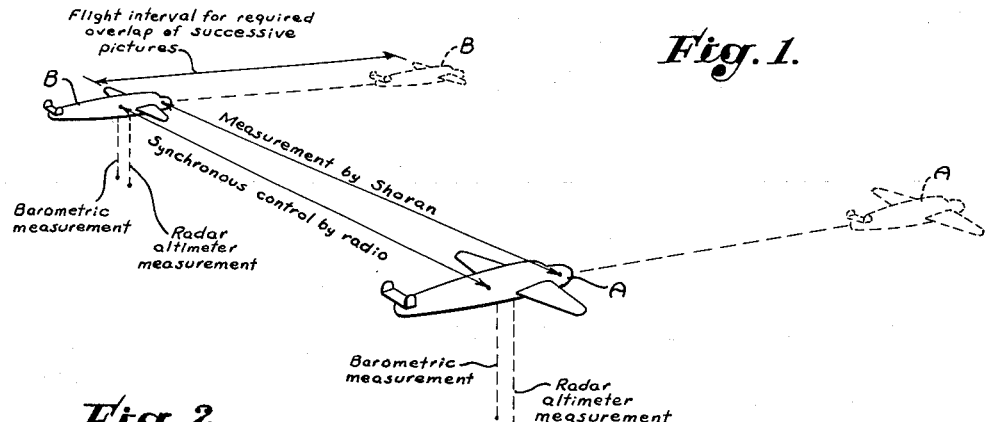
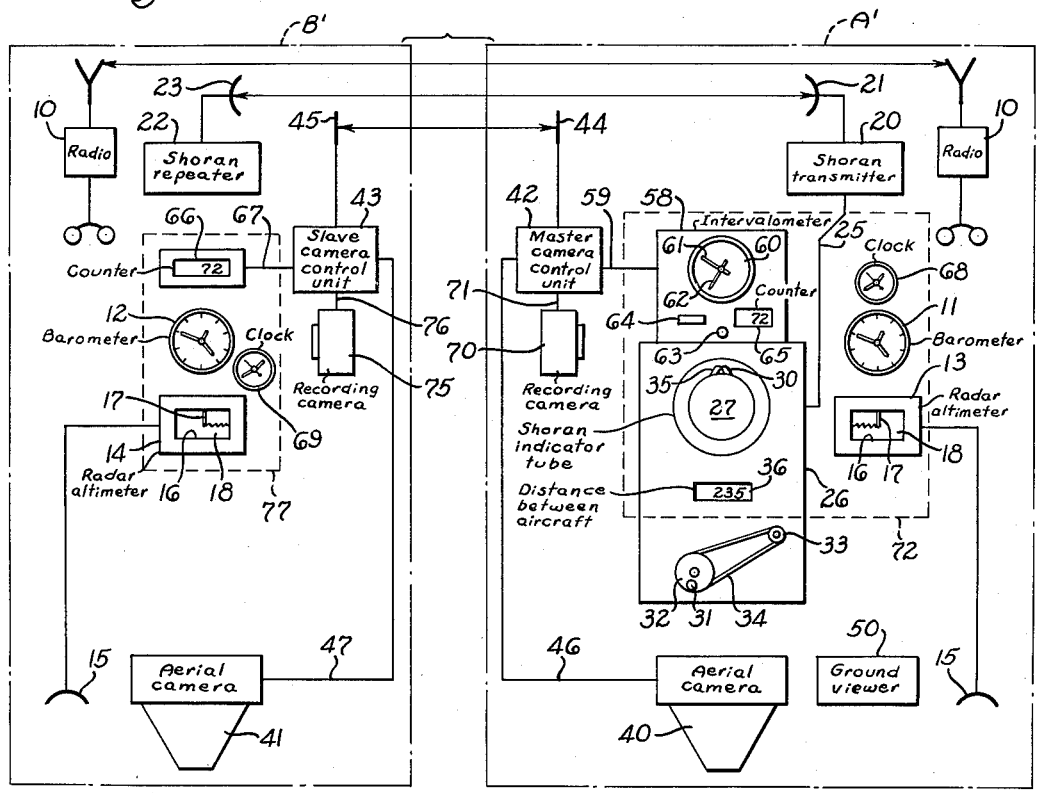
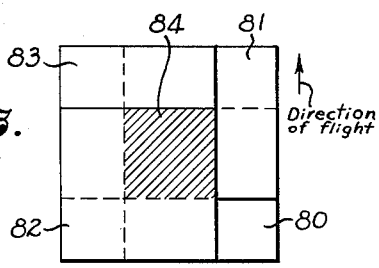
INVENTOR.
LEON T. ELIEL
BY HIS ATTORNEYS.
HARRIS, KIECH, FOSTER & HARRIS Oct. 11, 1955  L. T. ELIEL  2,720,029
PHOTOGRAMMETRIC APPARATUS
Filed Sept. 22, 1952  3 Sheets-Sheet 2

INVENTOR.
LEON T. ELIEL
BY HIS ATTORNEYS.
HARRIS, KIECH, FOSTER & HARRIS
By Ford W Harris Oct. 11, 1955          L. T. ELIEL          2,720,029
PHOTOGRAMMETRIC APPARATUS
Filed Sept. 22, 1952          3 Sheets-Sheet 3
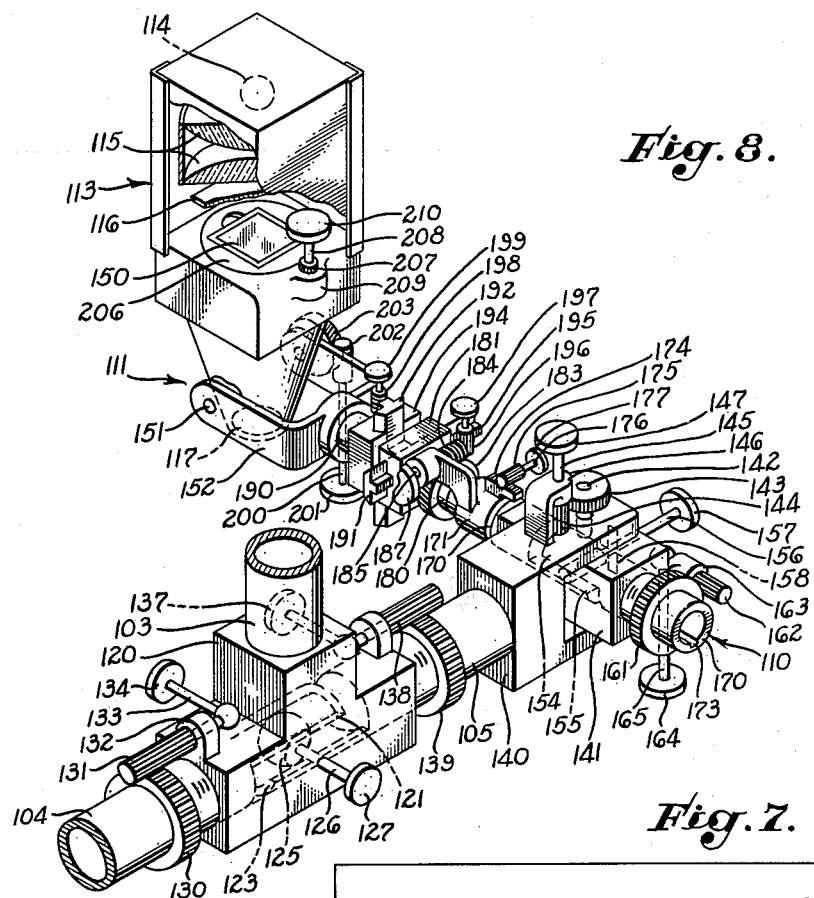
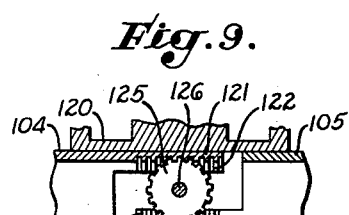
INVENTOR.
LEON T. ELIEL
BY HIS ATTORNEYS.
HARRIS, KIECH, FOSTER & HARRIS

United States Patent Office 2,720,029
Patented Oct. 11, 1955

2,720,029
PHOTOGRAMMETRIC APPARATUS

Leon T. Eliel, Los Angeles, Calif., assignor to Fairchild Aerial Surveys, Inc., Los Angeles, Calif., a corporation of California Application September 22, 1952, Serial No. 310,881

1 Claim. (Cl. 33—1)

This invention relates to photogrammetric procedures with special reference to stereophotogrammetric procedures and is directed to a method and apparatus having utility in various aerial mapping procedures including procedures involving the use of overlapping slotted templates as disclosed in Collier 2,102,612, issued December 21, 1937, and Eliel et al. 2,180,406, issued November 21, 1939.

In the conventional procedure for producing overlapping pictures of terrain an aircraft makes successive flights along adjacent parallel paths over the terrain to be mapped with the successive pictures on each flight taken at sufficiently close intervals for overlap and with the successive lines of flight sufficiently closely spaced for overlap of the successive rows of pictures. In the usual procedure, the resulting pictures are utilized progressively by a plotter having two projectors to project the terrain images in sets of two on a plotting table for arriving at the correct relationships among the images.

Eliel 1,699,136, issued January 15, 1929, discloses an improved technique which involves the use of three projectors to project the terrain images in sets of three to arrive at the correct relationships among the images. By observation of the projected images and by viewing stereoscopically the overlap of adjacent images, the operator of the plotter with a minimum of known ground control arrives at the correct relative positions of the three projectors of the plotter. In general the procedure of adjusting the plotter comprises a series of correction steps to eliminate various errors in the positioning of the projectors, which errors are manifest by so-called vertical parallax.

When the practice of using three projectors to handle transparencies in sets of three to achieve correct spatial orientation was disclosed in Eliel 1,699,136, it was believed that an infallible method had been found for eliminating all errors since the third projector theoretically eliminated the one indeterminate factor, namely, the rotation of two correctly matched images about their common axis. It has been found in practice, however, that a residual error arises from the inability of the operator to perceive minute degrees of parallax in carrying out the above-described chain of adjustments. This residual error is extremely elusive and usually escapes the ordinary checking procedures at the plotter. Consequently such errors are permitted to accumulate through an extensive series of images to cause trouble and inaccuracy in the progressive adjustment of a sequence of pictures.

After the images of projectors 1 and 2 in a three-projector plotter have been matched and their position of rotation about their common axis has been ascertained by matching the image from projector 2 with the image from projector 3, the only available further check lies in the possibility of matching the images from projectors 1 and 3. Such a cross-check by overlapping images from projectors 1 and 3 is not usually practical, moreover, because the overlap is seldom properly disposed for using image 3 with both images 1 and 2.

The general object of the present invention is to minimize necessary ground control and to provide an exceptionally rapid and economical mapping procedure and to afford a degree of accuracy heretofore unattained. Closer control is attained with respect to parallelism of the lines of flight, the spacing of the lines of flight, and the relative elevation of the points of exposure of the pictures. Accuracy is further advanced by the ascertainment of more flight data for subsequent use at the plotting table than heretofore obtained and by close correlation of pictures taken along two adjacent parallel flights for uniform ample overlap of the two corresponding series of pictures. As a result adequate overlap of photographs is insured to permit any cross checks on the plotting table that may be found advisable. Finally, accuracy is advanced by providing a new form of plotter to make possible new and different checking procedures at the plotter. An important feature of the invention is that it offers checking procedures at the plotter that are mutually independent in the sense that the factors or components involved in one checking procedure exclude the factors or components involved in the other checking procedure.

In general these broad objects and other readily perceived objects of the invention are achieved by photographing the terrain in a correlated simultaneous manner from a plurality of aircraft on parallel lines of flight and by using what may be termed a mutiple row plotter having rows of projectors corresponding to the mutiple lines of flight. The plurality of aircraft fly substantially abreast on their parallel lines of flight and the aerial cameras on the aircraft operate simultaneously under electronic control to take pictures that not only overlap uniformly and amply in the direction of flight but also overlap uniformly and to the same degree with respect to adjacent lines of flight.

Suitable instruments including electronic devices are utilized to maintain correct altitude and course and spacing of the plurality of aircraft. In the preferred practice of the invention, data is automatically recorded in the course of flight, the recorded data including instantaneous altitudes and instantaneous distances of separation of the aircraft at the instances of camera exposure. This recorded data is automatically correlated with the camera exposures.

Although any number of aircraft may be used under my basic concept, the present disclosure covers specifically the use of two aircraft flying simultaneously and abreast along parallel lines of flight and the use of a corresponding two-row plotter which may be aptly termed a quad plotter since it comprises four projectors defining a quadrangle.

The overlap of adjacent images is at least 50% and in the preferred practice of the invention is 60% of the area of each image. Thus, two successive simultaneous exposures by the aerial cameras on the two aircraft result in a set of four pictures covering a rectangular area of terrain and in the center of this area is an inner rectangle in which all four images overlap, the length of the sides of the inner rectangle of common overlap being 60% of the length of the sides of the overall rectangle. The resulting transparencies are used in sets of four in the quad plotter to cover progressively an area to be mapped, and each successive set of four may include two transparencies from the preceding set.

One object of the invention is to provide suitable apparatus for carrying out the described aerial photographic procedure and this object is attained in large part by the use of electronic components. One feature of the invention in this regard is the use of a radio control system for operating the plurality of cameras on the different aircraft simultaneously at predetermined time intervals. Preferably the duration of the intervals is determined with the aid of a ground-sighting device and the intervals are controlled by what may be termed on an intervalometer as will be explained. Another feature of a preferred practice of the invention is the use of the components of a shoran or similar system in which a radar transmitter on one aircraft and a cooperating radar repeater or retransmitter on a second aircraft provide instantaneous measurements of the distance of separation between the two aircraft. Such an arrangement not only serves as means for guiding the pilot of an aircraft in his task of maintaining parallel flight with respect to a second aircraft, but also provides accurate essential data for subsequent use at the plotting table in adjusting the projectors of the quad plotter. When the instantaneous distance of separation of the two aircraft is known and in addition the instantaneous relative altitudes of the two aircraft are known, the projectors of the quad plotter used for producing images from the corresponding transparencies may be initially positioned in close proximity to their correct positions for accurate image placement.

It is another object of the invention to provide means for automatically recording essential and pertinent data in the course of flight with the data correlated and identified relative to the successive aerial photographs from the two aircraft. This object is attained by using a special recording camera on both of the aircraft to photograph the indicators of various devices and instruments involved in the procedure. The recording camera is operated by the same master control that operates the various aerial cameras on the aircraft.

A special feature of the invention is the flexibility of the photographing, controlling and measuring system carried by the two aircraft in the sense that the system may be used to perform other functions to derive other data for a mapping project apart from the specific practices mentioned above. One of these additional procedures, for example, is the accurate measurement of the distance of separation between two terrain points many miles apart. This measurement is accomplished by flying the two aircraft simultaneously over the widely separated terrain points and both simultaneously photographing the terrain at the two points and simultaneously measuring electronically the distance of separation between the two aircraft. Another example is a procedure for finding the elevation of one of the two aircraft above unknown terrain by flying one of the two aircraft at a relatively low elevation directly under the other aircraft. Both aircraft photograph the terrain simultaneously and at the same time the distance of separation between the two aircraft is measured electronically to provide data for a subsequent calculation of the unknown elevation.

Other objects of the invention relate to the construction of a quad plotter for carrying out the described procedure. In general it is contemplated that the quad plotter will permit independent adjustment of the four projectors of the plotter both with respect to rotation about three perpendicular axes and with respect to rectilinear movement parallel to the three perpendicular axes.

The various objects and advantages of the invention will be readily apparent in the following description considered with the accompanying drawings.

In the drawings, which are to be regarded as merely illustrative:

Fig. 1 is a schematic view showing how two aircraft are flown simultaneously and abreast in parallel flight in accord with the teachings of the invention;

Fig. 2 is a diagram showing the system of instruments and devices carried by two cooperating aircraft in the preferred practice of the invention;

Fig. 3 is a diagram showing how four pictures of the terrain taken by two successive simultaneous exposures of the two cameras on the two aircraft cover a rectangular area with an inner rectangular area in which all four images overlap;

Fig. 7 is a greatly simplified diagrammatic plan view of a quad plotter that may be utilized in the practice of the invention;

Fig. 8 is a fragmentary perspective view showing details of construction of the quad plotter;

Fig. 9 is a fragmentary sectional view showing how two arms of the plotter are interconnected for relative longitudinal adjustment; and Fig. 10 is a fragmentary side elevation, partly in section, of one of the arms of the plotter.

Figure 4:
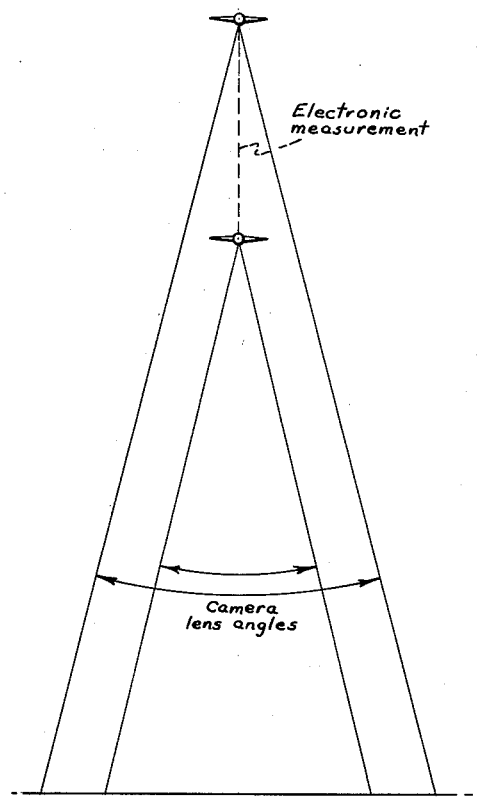
Fig. 4 is a diagram showing how two aircraft equipped with the present system of instruments and devices may cooperate to ascertain the elevation of one of the aircraft above unknown terrain.

Fig. 1 shows diagrammatically how two aircraft designated A and B fly abreast on parallel lines of flight to carry out the purposes of the invention. It is contemplated that one of the two aircraft, in this instance aircraft B, will be piloted by aid of well-known instruments and methods on a predetermined relatively straight-line course and that the second aircraft, in this instance aircraft A, will be guided with respect to this course by continuous measurement of the distance between the two aircraft, which measurement will be accomplished electronically by means commonly employed in shoran and similar systems. It is further contemplated that the altitudes of the two aircraft respectively will be continually measured, for example, by a barometer and/or a radar altimeter. Preferably, altitude measurements are carried out by both of these devices, one giving barometric elevation above a given datum such as sea level, the other giving elevation above ground.

As the two aircraft fly along their parallel courses, a master control on one of the two aircraft, in this instance aircraft A, periodically operates the aerial cameras on both of the aircraft simultaneously, remote control of the camera on aircraft B being accomplished by radio communication. The lines of flight of the two aircraft are sufficiently close together at the selected altitude of flight for the two simultaneous pictures taken by the two cameras respectively to overlap more than 50%. The successive synchronous exposures by the two cameras are timed for spacing along the line of flight to cause the successive pictures to overlap in the same manner.

The two or more aircraft that fly along parallel lines of flight for simultaneous photography may be equipped with various devices to carry out the basic concept. In the present example selected for the purpose of disclosure and to guide those skilled in the art, the two aircraft A and B may be equipped with a system of devices shown diagrammatically in Fig. 2. The instrumentalities carried by the aircraft A are shown in a rectangle designated A' and the instrumentalities carried by the aircraft B are shown in the second rectangle B'. It will be noted that the system includes a radio 10 on each of the two aircraft for verbal intercommunication. The essential instrumentalities for practicing the invention comprise means to measure the altitude of the two aircraft, means to measure the distance between the two aircraft, and means to operate the aerial cameras on the two aircraft synchronously at the required time intervals.

On aircraft A as indicated in the rectangle A' of Fig. 2, a barometer 11 continually indicates the altitude above sea level and a similar barometer 12 is provided on aircraft B as indicated in rectangle B'. In the preferred procedure the barometer 11 on aircraft A and the corresponding barometer 12 on aircraft B are synchronized or calibrated with respect to each other just prior to a mapping run by flying the two aircraft close together at the same altitude and, with the aid of radio intercommunication, making sure that the two barometers indicate the same value.

Preferably, radar altimeters 13 and 14 are also provided on the aircrafts A and B respectively. Each radar altimeter is connected to an antenna 15 and has a window 16 in which may be seen a stylus or pen 17 continuously plotting the altitude measurement on a moving record sheet 18.

In the present exemplification of the invention the distance between the two aircraft is measured electronically in the same manner as measurements in a shoran system. For this purpose aircraft A has a shoran transmitter 20 with an antenna 21 and the companion aircraft B is equipped with a shoran repeater or transmitter-receiver 22 having an antenna 23. The shoran transmitter 20 is connected by a cable 25 with a cabinet 26 in which is mounted the usual cathode-ray indicator tube 27.

The face of the tube 27 is provided with a reference pip 30 which may be etched on the glass surface of the tube and the shoran operator continually manipulates a crank 31 on a pulley 32 that drives a second smaller pulley 33 by means of a suitable belt 34, the purpose of such manipulation being to maintain an indicator pip 35 in continuous register with the reference pip 30. The two pips are shown slightly out of register for the purpose of illustration. When the indicator pip 35 which results from a round trip of electromagnetic wave travel between the two antennas 21 and 23 registers with the reference pip 30, the numerical value of the instantaneous distance between the aircraft appears in a small window 36 in the cabinet 26.

Synchronous operation of the aerial camera 40 on aircraft A and the aerial camera 41 on aircraft B may be accomplished, for example, by installing a master camera control unit 42 on aircraft A and installing what may be termed a slave camera control unit 43 on aircraft B. The master unit 42 has an antenna 44 for the radio transmission of control signals to a receiving antenna 45 of the slave unit. The master unit 42 on aircraft A is connected to the corresponding aerial camera 40 by a control cable 46 and in like manner the aerial camera 41 on aircraft B is connected to the slave unit 43 by a control cable 47. When the master control unit 42 is tripped, it sends a control signal through cable 46 for actuation of the aerial camera 40 and at the same time sends a radio signal to the slave unit 43 which in turn actuates the aerial camera 41 by means of the control cable 47. In this manner the two cameras are actuated to photograph the terrain simultaneously.

Figure 6:
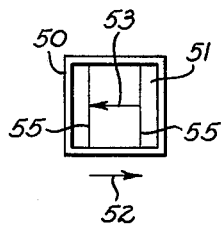
Fig. 6 is a diagrammatic plan view of a ground-observing device that may be employed to determine the proper interval between successive photographs.

The time interval between successive operations of the master control unit 42 may be determined with the aid of a ground viewer 50 on aircraft A. As shown in Fig. 6, the viewer 50 has on its top side a ground glass 51 on which the image of the relatively moving terrain appears for observation by the operator. As the aircraft moves in the direction of flight indicated by the arrow 52, objects on the terrain appear to travel across the ground glass in the direction of the arrow 53. The optics of the ground viewer 50 corresponds to the optics of the two aerial cameras 40 and 41 at least to the extent that the number of seconds required for the travel of a terrain object between two hair lines 55 on the ground glass 51 will be the time interval required between successive camera exposures to cause 60% overlap of the successive pictures at the particular elevation and speed of flight of the aircraft.

While a stop watch may be used for guidance in manually tripping the master control unit 42 at the required time intervals, preferably the master control unit is governed by what is termed an intervalometer 58 that is connected with the master control unit by a control cable 59. The intervalometer 58 has a dial 60 with a circular scale representing seconds of time and has a control pointer or hand 61 that may be conveniently adjusted manually for any number of seconds desired. The passage of time is indicated in seconds by a second pointer 62 which moves in repeated cycles clockwise from a zero position at the bottom of the dial. When the second pointer 62 reaches the position of the control pointer 61 the master control unit 42 is automatically tripped and the second pointer 62 drops back to its zero position to start a new timing cycle. Thus, the duration of the time cycle may be varied simply by varying the position of the control pointer 61.

The second pointer 62 may be returned to its zero point by pressing a button 63 and the master control unit may be tripped at any time to terminate a cycle and to start a new cycle by pressing a control member 64. In the course of each cycle a counter 65 visible through a window on the front of the intervalometer 58 is actuated to record the numerical sequence of the exposures. Preferably a similar counter 66 on the second aircraft B is actuated by the slave unit 43 by means of a control cable 67, the two counters being synchronized to show the same numerical sequence.

Preferably the system also includes clocks 68 and 69 on aircrafts A and B, respectively, which clocks have sweep second hands and are accurately synchronized. Either the clocks or the counters may be omitted since either indicates sequence, but the provision of both is desirable.

The data for each camera exposure may be recorded by hand in each aircraft in the course of a mapping run for subsequent use in plotting the terrain from the photographs but preferably the data is recorded automatically. As heretofore stated, a feature of the preferred practice of the invention is the use for this purpose of one or more recording cameras that are operated synchronously with the aerial cameras. In the present embodiment of the invention, a recording camera 70 is connected to the master control unit 42 in aircraft A by a control cable 71 and has a viewing area or picture field represented by the rectangle 72. It will be noted that a photograph taken by the recording camera 70 will make of record the readings of the barometer 11, the radar altimeter 13, the counter 72, the clock 68, and in addition will show the distance measurement in the window 36, the position of the pips and the time interval between successive photographs as indicated by the position of the control pointer 61.

Preferably aircraft B is also provided with a recording camera 75 connected to the slave control unit 43 by a control cable 76. The field of view or picture area of the second recording camera 75 as indicated by a rectangle 77 includes the barometer 12, the counter 66, the clock 69 and the window of the radar altimeter 14.

Two successive exposures on the part of the cameras carried by the two aircraft A and B will result in a quadrangle of four exposures having an inner quadrangular area of overlap common to all four exposures. Fig. 3 shows diagrammatically two square pictures 80 and 81 photographed in succession by aircraft A and two corresponding and simultaneously photographed pictures 82 and 83 obtained by the second aircraft B. Because of the simultaneity of the pictures taken from the two aircraft and the correct spacing of the two lines of flight as well as the correct intervals between successive exposures in accord with the altitude of flight, the four exposures are accurately positioned relative to each other for the desired 60% overlap represented by the inner square 84. In a typical mapping procedure involving pictures 9" square, the inner quadrangle 84 of 60% overlap on the part of the four pictures will be 5.4" square.

The use of a quad plotter as permitted by the new method of correlated simultaneous aerial photography has outstanding advantages over the use of a three-projector plotter as heretofore used to match images derived by the usual procedure of photographing terrain from a single aircraft on successive parallel lines of flight. Because the central area of common overlap of the rectangle of four images provided by the quad plotter is under close control and is always and uniformly of proper proportions, six pairs of images may be readily matched in contrast to the three pairs permitted by a three-projector plotter. Considering the quad projectors as numbered 1 to 4, the six pairs are: 1–2, 2–3, 3–4, 1–3, 1–4, and 2–4. Two completely independent cross or diagonal checks are provided. Thus a diagonal check by overlap of images 1 and 3 and a diagonal check by overlap of images 3 and 4 are completely independent since no image involved in one checking pair is involved in the other checking pair.

The quad plotter affords a further highly advantageous self-checking procedure which may be appreciated in the light of basic and time-tested checking techniques practiced in surveying procedures. Thus, initial correction adjustment of the four projectors of the quad plotter may be established by matching first images 1 and 2, and then images 2 and 3 to eliminate all indeterminate factors. This initial correction adjustment extends half way around the quadrangle of projectors. Checking this initial correction adjustment by "closing" the quadrangle is accomplished by proceeding to match images 3 and 4 and finally images 4 and 1. It is apparent that this checking procedure is equivalent to surveying a line outward from a starting point and closing by continuing to survey in a loop back to the starting point. In both procedures any error involved becomes apparent in the final closure step.

Referring further to surveying principles, it is to be noted that the quad plotter as used with the described procedure of aerial photography provides "strength of figure" for accurate location of unknown points. In surveying by triangulation, triangles are sought with all three angles relatively large, such triangles being known as strong figures. A quadrangle has maximum strength of figure and even the angles formed by the diagonals of a quadrangle that is substantially a square are exceptionally strong figures.

Instead of closing the quadrangle unidirectionally as described above, the procedure may comprise initial correction adjustment by matching images 1 and 2 and then images 2 and 3 to complete the initial adjustment and checking the initial adjustment by matching images 1 and 4 and 4 and 3 or, as an alternate check, first matching images 3 and 4 and then images 4 and 1. It is apparent that the operator of the quad plotter has at his disposal a large choice of procedures for checking a set of four images and when a troublesome error becomes evident he has an opportunity to exercise intelligent choice as to which checking procedure is most likely to narrow down the identification and location of the error. It is also to be noted that in a procedure in which each successive set of four transparencies carries over two transparencies from the preceding set, there is exceptional carry-over of previously determined accuracy. Such carry-over is not afforded by a three-projector plotter.

Since the elevation above sea level of the terrain being photographed may be found by subtracting values indicated by a radar altimeter from values indicated by a barometer, it is desirable to make a check on one of the two barometers immediately before or after a mapping run to arrive at some correction factor to be applied to the recorded altitude data. A feature of the new procedure is the concept of obtaining such a check simply by making an aerial photograph of terrain the altitude of which with respect to sea level is accurately known. The reading of the barometer is recorded at the time of the check exposure, preferably by means of a synchronized recording camera as heretofore described. Since distances between prominent objects on the photographed terrain are known in addition to the altitude above sea level above the terrain, the scale or distance between the objects on the resulting photograph may be used to calculate the actual elevation of the aircraft relative to the terrain. This relative elevation added to the elevation of the terrain gives the correct barometer reading that should appear on the barometer at the time of the photograph. Such a check point can be repeatedly used on subsequent flights to check the barometric altimeter.

A further feature of the invention is that it affords a procedure for accurately measuring the distance between one of the aircraft and the terrain below independently of the radar altimeter to arrive at a value that may be subtracted from the barometric reading of altitude to obtain the altitude above sea level of the unknown terrain. A simple procedure for this purpose is to fly the two aircraft simultaneously over the unknown terrain with one of the two aircraft directly below the other and quite close to the ground. The vertical distance between the two aircraft may then be measured electronically by the previously described shoran arrangement and the distance of the lower aircraft above the ground may be closely estimated and added to the electronic measurement.

A feature of the invention is that over hostile territory in time of war or over territory where it is inadvisable to fly one of the aircraft so close to the ground, the altitude of either of the two aircraft above the terrain may be measured by an alternate procedure illustrated by Fig. 4. This second procedure involves photographing the same terrain area from the two aircraft at different altitudes simultaneously and at the same time measuring the vertical distance between the two aircraft electronically. The data consisting of the scale of the two photographs and the distance between the two aircraft may be used in different ways to obtain the desired information. For example, it may be found by measuring the distance between identical objects on the two photographs that the inter-object distance on the photograph taken from the lower aircraft is 1.5 times the inter-object distance on the photograph taken from the upper aircraft and therefore the elevation of the upper aircraft relative to the terrain is 1.5 times the elevation of the lower aircraft. Since the actual elevation of the upper aircraft from the lower aircraft has been obtained accurately by the shoran apparatus, further calculation is simple. Thus, if the electronic measurement is 10,000 ft., one third of the altitude of the upper aircraft above the terrain will be 10,000 ft. and the full distance above the terrain of the upper and lower aircraft respectively will be 30,000 ft. and 20,000 ft.

Figure 5:
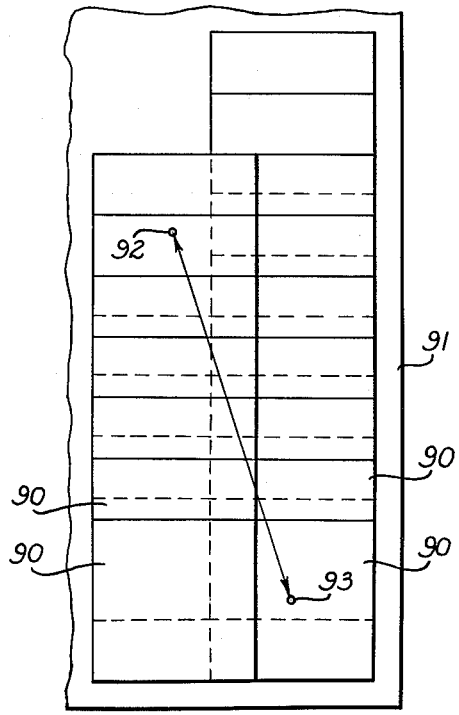
Fig. 5 is a diagram showing a floating anchor on an assemblage of overlapping slotted templates, the actual length of the anchor having been measured by two aircraft equipped with the present system.

A further feature of the invention, as heretofore mentioned, is the accurate determination of the distance between points on a mapping run that may be used as floating anchor points in the adjustment of the subsequent series of overlapping slotted templates. Fig. 5 shows in a simplified manner a series of overlapping templates 90 on a table surface 91 for practicing the mapping technique set forth in Eliel 2,180,406. Such a series of templates by virtue of their slidingly interconnected intersecting slots may be expanded or contracted in length. The proper length to which the series of templates should be adjusted for a map of a given scale is determined by the actual distance between two widely spaced points of the corresponding terrain. Thus, if the actual distance between two prominent objects 92 and 93 of the photographed terrain is known, the series of templates 90 may be adjusted to place the photograph points 92 and 93 at the correct distance of separation for the particular scale of the map in progress. Point 92 may be, for example, a building, and point 93 may be a crossroad. In the course of a mapping run two such objects will be selected and subsequently the two aircraft will separate, one aircraft heading for the object at 92 and the other heading for the object at 93. With their flights co-ordinated by radio communication, the two aircraft maneuver to pass approximately over the two respective objects simultaneously and then the described apparatus on the two aircraft is utilized to make a pair of photographs simultaneously with simultaneous electronic measurement of the distance between the two aircraft. The two aircraft may be, for example, as much as 300 miles apart. If the aircraft were not exactly over the desired points this situation will be indicated in the photographs and with radar altimeter determination of scale a satisfactory correction can be made.

A suitable quad plotter for practicing the invention may be constructed as indicated by Figs. 7 to 9. In this construction a plotting table 100 is straddled by a suitable frame comprising a pair of U-shaped tubular members 101. Mounted on the two tubular members 101 is a spider assembly 102 from which depends a central vertical post 103. A pair of diametrically positioned arms 104 and 105 is mounted on the lower end of the vertical post 103 at substantial spacing above the plotting table 100. The diametrical arm 104 carries at its outer end a pair of longitudinally aligned arms 106 and 107 to support corresponding projectors 108 and 109 and the other diametrical arm 105 in like manner carries a pair of aligned arms 110 and 111 to support corresponding projectors 112 and 113.

Each of the four projectors has the usual light source 114 (Fig. 8), pair of condensers 115, filter 116 and lens 117.

As shown in Fig. 8 the inner ends of the two diametrical arms 104 and 105 are slidingly and rotatably mounted in a T-shaped block 120 on the lower end of the vertical post 103, the two inner ends being of tubular construction as shown. The inner end of arm 104 is cut away as indicated in Fig. 9 to provide an overhanging end portion 121 with internal circumferentially curved rack teeth 122 and in like manner the inner end of arm 105 is cut away to form an underlying end portion 123 with inner circumferentially curved rack teeth 124. Meshed with the rack teeth 122 and 124 is an adjustment gear 125 mounted on a shaft 126 that is provided with a manually operable knob 127. It is apparent that this construction permits an ample degree of relative rotation between the two arms 104 and 105 in the T-shaped block 120 and at the same time permits rotation of the shaft 126 by the knob 127 to increase or decrease the overall length of the two arms by rack and gear movement.

Independent rotation of arm 104 is governed by a gear 130 fixedly embracing the arm in combination with a pinion 131 of sufficient length to maintain engagement with the gear throughout the range of longitudinal adjustment of the arm. The pinion 131 is journalled in a bracket 132 on the T-shaped block 120 and is operatively connected in a suitable manner to a laterally extending shaft 133 carrying an adjustment knob 134. In like manner a second adjustment knob 137 is operatively connected to a long pinion 138 in mesh with a gear 139 for independent rotation of the second diametrical arm 105.

It is contemplated that each of the two pairs of arms 106, 107, and 110, 111 will be maintained in longitudinal alignment but may be swung in unison in horizontal or near horizontal planes relative to the two diametrical arms 104 and 105. For this purpose the outer end of arm 105 may be provided, for example, with a bracket block 140 in which a second block 141 is pivotally mounted by suitable pins, the second block slidingly and rotatably carrying the inner ends of the two arms 110 and 111. One of the pivot pins 142 of the second or inner block 141 fixedly carries a gear 143 that is engaged by a pinion 144. The pinion 144 is on a shaft 145 that is journalled in a bracket 146 and carries an adjustment knob 147. Rotation of the adjustment knob 147 varies the angular position of the inner block 141 in the bracket block 140.

As shown in Fig. 8 each of the four projectors 108, 109, 112 and 113 is adapted to hold a transparency 150 made from an aerial photograph and it is contemplated that the quad plotter will be suitably constructed to permit each of the four transparencies to be adjusted independently of the other three both with respect to straight-line motion along three perpendicular axes and with respect to rotary motion about the same axes. One of the three axes is the longitudinal axis of the pair of arms 110 and 111. In Fig. 8 the second axis for adjustment of the transparency 150 in the projector 113 is provided by a pair of coaxial pivot pins 151 by means of which the projector is mounted in a bracket 152 at the outer end of arm 111. The third axis for adjustment is an upright axis through the center of the transparency 150. Fig. 8 shows by way of example a construction that may be employed to provide independent adjustment of the transparency 150 in the projector 113 in these six respects.

As heretofore indicated, the inner end of the arm 111 that carries the projector 113 and the inner end of the corresponding arm 110 that carries the projector 112 are both slidingly and rotatably mounted in the pivoted block 141. Preferably the inner ends of the two arms are mounted in the same manner as heretofore described with reference to the mounting of the arms 104 and 105 in the T-shaped block 120. Thus arm 110 has an overhanging rack extension 154 and arm 111 has a similar underlying rack extension 155 and these two rack extensions are engaged by a gear (not shown) that is mounted on a shaft 156 carrying an adjustment knob 157. Clockwise rotation of the knob 157 as viewed in Fig. 8 causes relative outward movement of the two arms 110 and 111 to increase their overall length for increased spacing between the two projectors 112 and 113, and counterclockwise rotation moves the two projectors toward each other.

Preferably the two arms 110 and 111 may also be rotated together as a unit, and to permit a suitable range of such movement the inner block 141 is formed with an upright slot 158 to provide clearance for rocking movement of the shaft 156. For rotational adjustment of the two arms 110 and 111 in unison the arm 110 fixedly carries a gear 161 that is engaged by a pinion 162, the pinion being rotatably mounted in a bracket 163 carried by the inner block 141. A knob 164 on a shaft 165 is operatively connected to the pinion 162 for rotational adjustment of the two arms in unison.

Each of the four arms 106, 107, 110 and 111 is of telescope construction to permit independent longitudinal expansion and contraction, each being made in four longitudinal sections. The detailed description of one of the arms will suffice for all four. As best shown in Fig. 10 the inner tubular section 170 of arm 111, for example, that is slidingly journalled in the inner block 141, slidingly embraces the inner end of a second arm section 171 which is formed with a key or spline 172 to slide in a longitudinal keyway 173. For control of the relative longitudinal position of the second arm section 171 it is formed with an upper longitudinal rack 174 in engagement with a pinion 175 that is rotatably carried by the inner arm section 170. As shown in Fig. 8 the pinion is mounted on a shaft 176 and is controlled by an adjustment knob 177.

As best shown in Fig. 10, journalled in the outer end of the second arm section 171 is a third arm section 180 the outer end of which is in the form of a block 181 having a transverse guideway 182 on its outer face. Rotation of the third arm section 180 relative to the second arm section 171 is controlled by engagement of a transverse worm 184 with a worm gear 183 that embraces the third arm section. The worm 184 is carried by a shaft 185 that is journalled in a bracket 186 on the second arm section 171 and is manually rotated by an adjustment knob 187. This construction permits rotation of the corresponding projector about the longitudinal axis of the arm.

For straight-line adjustment of the projector along two axes perpendicular to the longitudinal axis of the arm, the arm is formed with a fourth outer section 190 that is adjustably connected to the third arm section 180 by a pair of united slide members 191 and 192. These two slides are positioned perpendicular to each other and are connected back to back at their mid portions. Slide member 191 rides in the previously mentioned guideway 182 in the block 181 on the outer end of the third arm section 180 and the second slide member 192 rides in a similar guideway in a block 194 that is on the inner end of the fourth arm section 190.

The slide member 191 has rack teeth 195 engaged by a pinion 196 that is rotatably carried by the block 181 and is rotatable by an adjustment knob 197. In like manner the second slide member 192 is in the form of a rack engaged by an upright worm 198 that is rotatably carried by the block 194 and is rotatable by an adjustment knob 199. It is apparent that rotation of the adjustment knob 197 will shift the fourth outer arm section 190 in one transverse direction relative to the axis of the arm and rotation of the second adjustment knob 199 will cause a similar shift in a second transverse direction perpendicular to the first transverse direction.

The previously mentioned bracket 152 which is unitary with the outer end of the fourth arm section 190 is provided with suitable adjustment means for rotation of the projector 113 about the axis of the two coaxial pivot pins 151. For this purpose the bracket 152 rotatably carries an upright shaft 200 that is rotated by an adjustment knob 201 and carries a worm 202 in engagement with a worm gear 203. The worm gear 203 is fixedly mounted on one of the two coaxial pivot pins 151 so that rotation of the worm gear rocks the projector 113.

Adjustment of each transparency 150 about an axis passing perpendicularly through its mid point is provided by mounting the transparency in a circular holder 206 that is rotatably mounted in the projector. The rotary holder 206 is formed with gear teeth (not shown) in its circumference for engagement by a pinion 207. The pinion 207 is carried by a shaft 208 that is journalled in a bearing 209 and carries an adjustment knob 210.

It may be readily understood how each transparency may be adjusted in six respects independently of the other projectors. Knob 177 governs adjustment of the projector along the axis of the arm on which it is mounted and knob 187 rotatably adjusts the projector about the same axis. The knob 197 that operates the transverse slide 191 causes transverse movement of the projector along the axis of the slide and knob 201 rotates the transparency about an axis extending in the same direction.

The knob 199 acting upon slide 192 adjusts the transparency in a direction parallel to the axis of the slide 192 and the knob 201 rotates the transparency about an axis passing in the same direction through its mid point.

From the foregoing it may be readily appreciated that two aircraft equipped for simultaneous aerial photography together with simultaneous electronic measurement of the distance of the separation between the two aircraft afford a highly flexible means for quickly and economically obtaining aerial photographs and essential data for photogrammetry, and that the use of two such aircraft in conjunction with the quad plotter provides a mapping procedure having numerous important advantages over techniques employed heretofore.

It will also be readily appreciated by those skilled in the art that various changes, substitutions and other departures from my description of specific practices of the invention may be made within the scope and spirit of the appended claim.

I claim as my invention:

In a stereophotogrammetric system for mapping terrain, the combination of: at least two aircraft for flight substantially abreast along substantially parallel paths over the terrain at a selected altitude and a selected distance between the two aircraft; electronic means for indicating on at least one of said aircraft the instant distance between the two aircraft; an aerial camera on each aircraft, said cameras having lens angles wide enough for overlapping images of the terrain at said altitude and said distance of separation; a master control including means for electronic communication between the two aircraft for actuating said two cameras simultaneously; an adjustable intervalometer on one of said aircraft to operate said master control at regular intervals; and ground-sighting means on the aircraft having said intervalometer for guidance in adjusting the intervalometer, said ground-sighting means having a viewing field for observation of terrain objects, said viewing field having two limits spaced apart in the direction of travel in accord with said lens angle and in accord with a desired degree of overlap of successive images whereby the time period for the apparent movement of a terrain object between said limits is the desired time interval between successive actuations of said master control.

References Cited in the file of this patent

UNITED STATES PATENTS

| | | |
|---|---|---|
| 1,331,978 | Brock et al. | Feb. 24, 1920 |
| 1,585,484 | Gasser | May 18, 1926 |
| 1,650,978 | Boykow | Nov. 29, 1927 |
| 1,699,136 | Eliel | Jan. 15, 1929 |
| 1,980,657 | Bauersfeld | Nov. 13, 1934 |
| 2,055,883 | Terry | Sept. 29, 1936 |
| 2,167,412 | Baesecke | July 25, 1939 |
| 2,403,755 | Rankin | July 9, 1946 |
| 2,414,566 | Thomas | Jan. 21, 1947 |
| 2,489,218 | Herbold | Nov. 22, 1949 |
| 2,489,221 | Herbold | Nov. 22, 1949 |
| 2,610,226 | Klaasse et al. | Sept. 9, 1952 |

OTHER REFERENCES

Sharp, "Photogrammetry," pages 32, 33, and 55, published by John Wiley & Sons, New York, 1943. (Copy in Scientific Library.)